United States Patent Office 3,263,548
Patented August 2, 1966

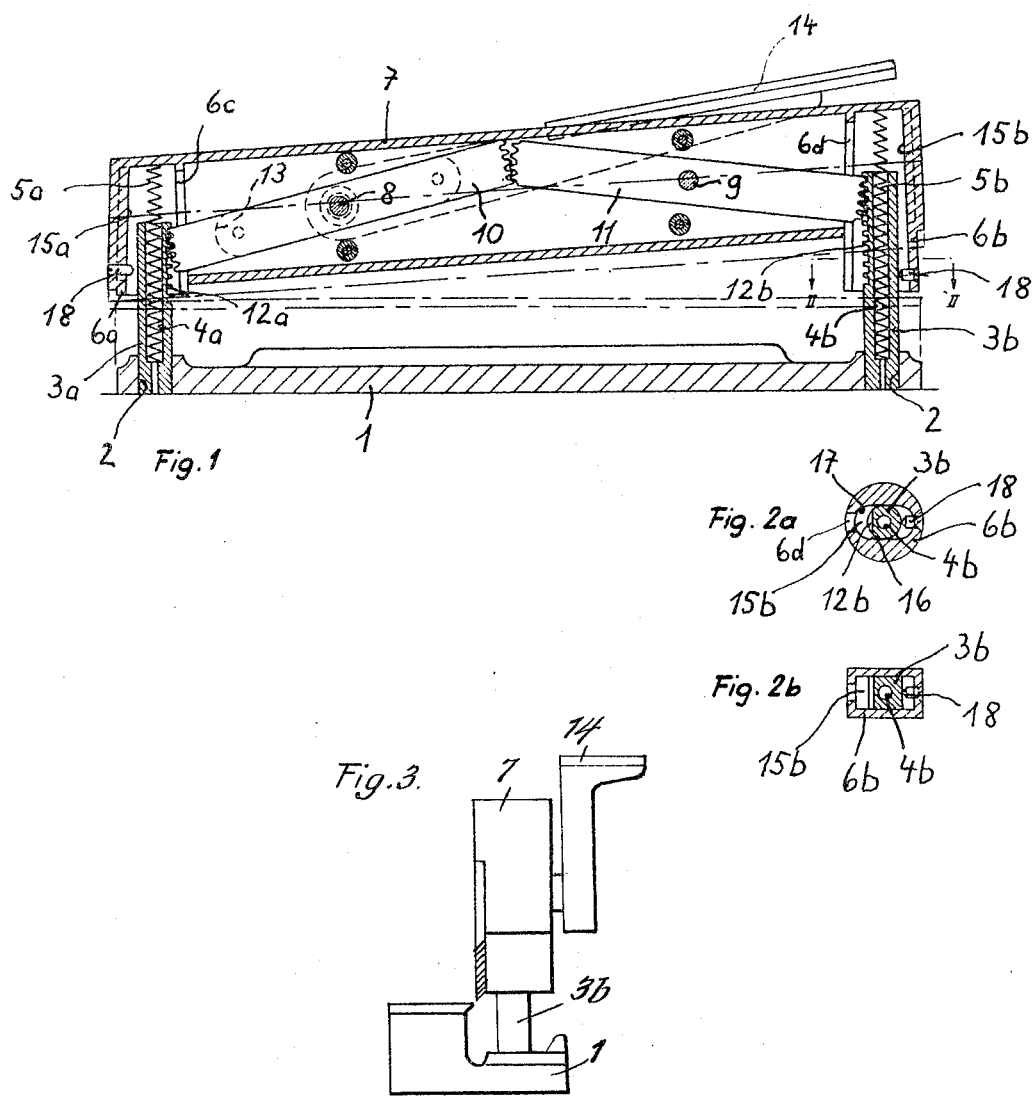

3,263,548
CUTTING MACHINE WITH TAPERED GUIDE MEANS FOR THE MOVABLE BLADE
Victor Kobler, Huttenstrasse 42, and Werner Kobler, Huttenstrasse 43, both of Zurich, Switzerland
Filed Apr. 20, 1964, Ser. No. 360,934
12 Claims. (Cl. 83—633)

This invention relates to a cutting machine having a pair of knives, one of which is arranged on a fixed base, and the other of which is arranged in a vertically movable machine part. The movable machine part is guided along two columns attached to the base.

In other machines of this type, the column guides are attached to the movable machine part by means of guide sleeves with very little leeway. This design assumes that both the axis interval and the parallelism of the axes of the columns and of the guide sleeves are kept very accurately. In addition this requires the surfaces of the columns and the guide sleeves to be worked with a very high degree of accuracy in order to prevent the guides of the movable machine part from becoming stuck on the columns in connection with the spring effect which is created when the machine part, which bears the vertically movable knife, is pressed down. These conditions require not only great accuracy in the individual machine elements, but also call for a very precise installation of these elements. But this cannot prevent play or looseness from developing between the guide and the columns after longer use. This is very undesirable, and causes the movable machine part to become stuck.

This invention is intended to provide a cutting machine of this general type in which the aforesaid disadvantages can be eliminated. For this purpose, the cutting machine is so characterized with the scope of the invention that the column guides, provided for the movable machine part, have a horizontal play or looseness in the vertical plane running through both column axes, but not transversally thereof. As a result of this movable machine part, which bears the vertically movable knife, is accurately guided laterally with respect to its plane of movement. On the other hand, as a result of the previously mentioned play it can perform minor movements, which are very unimportant with respect to the cutting process itself, along its plane of movement, that is, in the direction of the knife edge. This means that the interval and the parallel layout of the columns in the column axis plane need no longer be absolutely accurate and that precision work on the guide surfaces, which are lateral to this plane, and which has previously been provided on the movable machine part is no longer required. This also considerably simplifies the installation of the columns. There is also a possibility of making the column guides on the movable machine part so that it will be made integral with the movable machine part, by die casting. This could be done because the taper of the guides, which is required for the flawless molding of the machine part, can be provided on the guide surfaces which have a certain amount of play opposite the columns. This, then, would not require these surfaces to be finished. Means are provided in order to adjust or at least partly eliminate the play of the vertically movable machine part, which is possible in the direction of the cutting edges, after the installation of the parts.

The attached drawing shows one possible version of the object of this invention.

FIGURE 1 is a vertical section through the column axis of the machine.

FIGURE 2a is a cross section along line II—II in FIGURE 1, showing a first embodiment of the column guide arrangement.

FIGURE 2b is similar to FIGURE 2a, and shows a second embodiment of the column guide.

In FIGURE 1 of the drawing, numeral 1 designates the base of the cutting machine on which the first, horizontal knife is mounted. In two through-extending drill holes 2 in base 1, there are two vertical guide columns 3a, 3b, inserted with force fit. Each of these columns 3a, 3b, has a central penetrating drill hole 4a, and 4b, respectively, against whose lower ends the lower ends of spiral spring 5a, 5b, respectively, are supported. On columns 3a, 3b are disposed guide sleeves 6a, 6b, which may be in one piece with a box-shaped knife spar 7. At the front side of this knife spar 7, is disposed a second knife. This second knife is attached here and its cutting edge forms a plane parallel to the plane of the column axis. Inside the knife spar 7, is disposed the drive mechanism for knife spar 7 which at the same time guides the spar along a straight line. The mechanism has two gear tooth levers 10 and 11 which are swingable around axles 8 and 9, respectively. These gear tooth levers engage each other with their inner lever arms while their outer levers arms, which are also provided with teeth, engage columns 3a and 3b at 12a and 12b where said columns are also provided with teeth. A catch lever 13 is rigidly connected with axle 8 by way of gear tooth lever 10. Outside spar 7, a hand lever 14 is attached to axle 8. If this hand lever 7, is pressed downward, this action, as a result of the movement of the toothed lever 10 and 11, produces a shift of spar 7 in the same direction. This then produces the cutting motion.

According to the version shown in cross section in FIGURE 2a, columns 3a and 3b have a round cross section. Guide holes 15a, 15b of columns 3a, 3b, respectively, have elongated cross section in the direction of extent of the plane of the columns axes. Columns 3a and 3b fit exactly into guide holes 15a, 15b in a direction transverse to the plane passing through the columns' axes. This means that these columns have horizontal play along the columns' axes plane, this being shown in exaggerated size in the drawing for reasons of greater clarity. The level broad-sides 16 of the guide drill holes are parallel to each other and to the plane of the columns' axes. On the other hand, the semi-cylindrical narrow sides 17 of these drill holes slightly diverge from each other, in a conical fashion, in the downward direction. This makes it easier to pull spar 7 away after the casting of the cores for the guide sleeves. As can readily be seen in the drawing, the play created between the columns 3a, 3b, in the plane of the axes of the columns and the guide walls 17 is easily limited by the bilateral engagement of gear toothed levers 10, 11 into the gear teeth at 12a, 12b to the always necessary gear play. In order to be able to regulate this play, an adjusting screw 18 is provided attached to the outside wall of guide sleeves 6a and 6b. When one wishes to install the knife spar 7 with its drive mechanism on columns 3a, 3b there is the entire planned gear tooth play available. Here, adjusting screws 18 enable one to reduce this play to the absolute degree necessary, after installation.

In the embodiment represented in FIGURE 2b, columns 3a, 3b have a square cross section while the drilled holes 15a, 15b of the guide sleeves 6a, 6b, respectively, have rectangular cross sections. The columns fit accurately into these guide sleeves 6a, 6b, in a lateral direction. This means that they have the required play also here, in the plane of the axes of the columns which is limited by the gear tooth play of the drive mechanism and which can be reduced as desired after the installation of the knife spar by means of adjusting screws 18.

It is, of course, understood that, in the case of the embodiment according to FIGURE 2a, columns with square or rectangular cross sections may be provided here; similarly, in the case of the embodiment according to FIGURE 2b, and the drill hole cross section for the guide sleeves may correspond to the cross section of the version discussed with respect to FIGURE 2a. The essential thing here is that the columns have practically no play transversally of the plane of the columns axes, but have relatively great horizontal play in the mentioned plane. This means that one can have relatively large production tolerances, installation is very simple, the knife spar can be made in one piece with the guide sleeves in the form of a die-casting piece, and it is not necessary to finish the guide surface. Nevertheless, as a result of the accurate lateral guidance of the knife spar, the apparatus can cut perfectly. The cores for forming the guide sleeves are provided with ribs in the form of grooves which produce the slots 6c, and 6d for the penetration of gear tooth levers 10, 11.

If, as in the example described, knife spar 7 has a special parallel guidance through its gear tooth lever mechanism, then a little play is certainly permissible in the direction of the knife edge because the spar cannot be swung on the columns. Adjusting screws 18 are then used primarily in order to distribute the play of the gear tooth lever, opposite the teeth of the columns, in a uniform manner on both sides. If, however, the spar does not have this kind of parallel guidance, that is, if, for example, the knife spar is pressed downward by means of a cam, located on an operating lever on the base, said cam engaging in the middle of the longitudinal extent, then the column guide must practically not have any play; otherwise, cannot be assured. In this case, adjusting screws 18, which may be provided, under certain circumstances, in pairs diametrically opposite each other at each guide sleeve, are used to eliminate the originally existing play of the columns in their guide sleeves.

We claim:

1. A cutting machine comprising a base provided with a knife horizontally mounted thereon, a part mounted on said base for vertical movement and provided with an elongated knife extending approximately parallel to said first knife and movable therewith into operative cutting relation with said first knife, said part having guiding abutment means facing approximately in the longitudinal direction of extent of said knives, two parallel vertical guide columns attached to said base for guiding said vertically movable part relative to said base, said vertical longitudinal guide columns being appreciably spaced from said abutment means in the direction of extent of said knives so that said movable part has longitudinal horizontal play relative to said guide columns, said movable part also having abutment surfaces facing toward each other transversally to the longitudinal direction of extent of said knives and in close guiding engagement with said guide columns so as to allow substantially no play in the vertical plane extending through the respective axes of said guide columns transversally of said longitudinal direction of said knives.

2. A cutting machine according to claim 1, and in which said movable part is provided, guide sleeves into which said columns extend respectfully, said guiding abutment means and surfaces being located with said guide surfaces.

3. A cutting machine according to claim 2, and in which the inner horizontal cross sectional dimension of each of said guide sleeves is longer in one direction than in the other direction, the longer dimension being limited by two parallel straight walls which are connected to each other by walls extending along the shorter sides of said cross section.

4. A cutting machine according to claim 3, and in which said inner cross sections of said columns are round.

5. A cutting machine according to claim 3, and in which said inner cross sections of said columns are rectangular.

6. A cutting machine according to claim 3, and in which said base is provided with openings into which said columns are pressure fitted.

7. A cutting machine according to claim 3, and in which said walls extending along said narrow sides of the cross section are straight.

8. A cutting machine according to claim 3, and in which said walls extending along said narrow sides of the cross section are curved.

9. A cutting machine, according to claim 2, and in which said movable machine part has the form of a knife spar and said column guide sleeves consist of one single die-cast piece.

10. A cutting machine according to claim 2, and in which the faces of the inner walls of said sleeves have wider and narrower transverse dimensions said narrow dimensions diverging downwardly.

11. A cutting machine according to claim 2, and in which said guiding abutment means is comprised of the ends of adjusting screws provided in the walls of said guide sleeves to adjust the play between said sleeve walls and said columns, said screws having their axes in the plane of the axes of said columns.

12. A cutting machine according to claim 11, and in which a drive mechanism is provided for driving said vertically movable machine part, said machine part being provided with a spar which provides for the parallel guidance of said drive mechanism.

References Cited by the Examiner

UNITED STATES PATENTS 2,639,771   5/1953   Kobler et al. _____ 83—644 X

WILLIAM W. DYER, JR., *Primary Examiner.*

L. B. TAYLOR, *Assistant Examiner.*